Jan. 11, 1927. 1,614,057
L. BELCHER
PROCESS FOR MAKING CONFECTIONS
Filed May 10, 1923
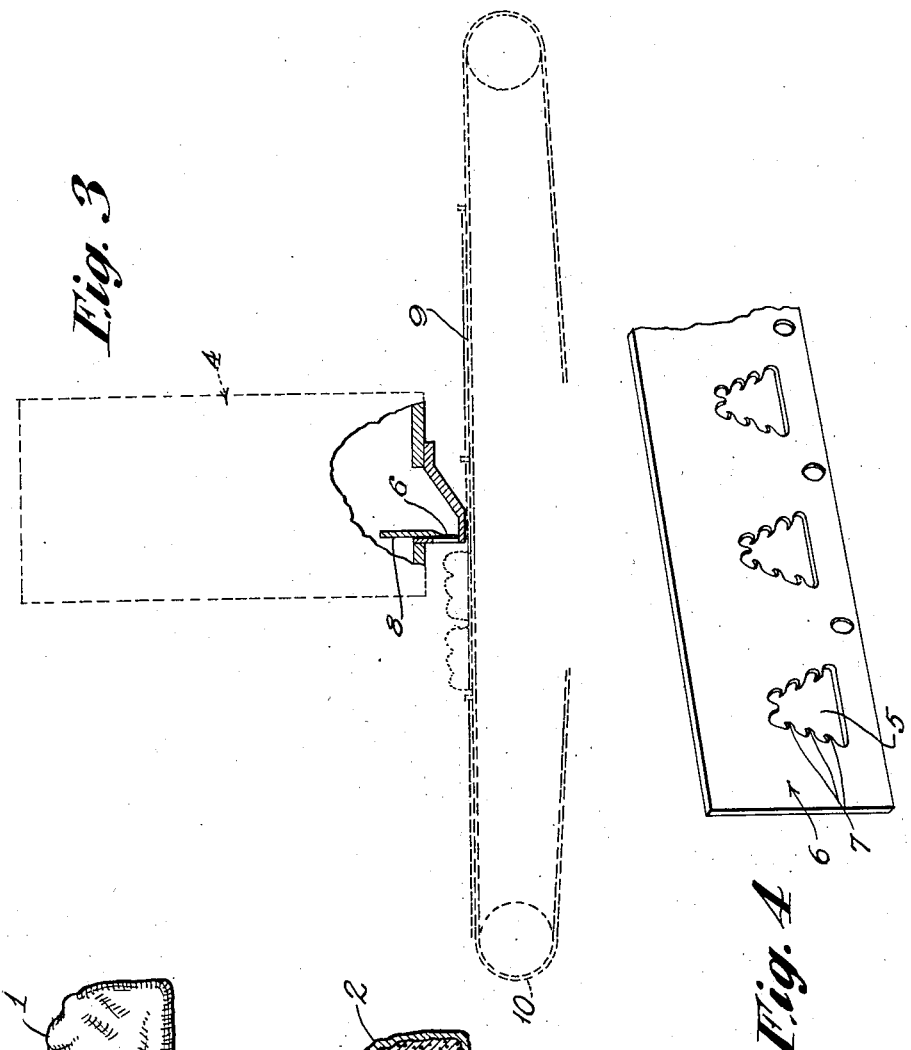
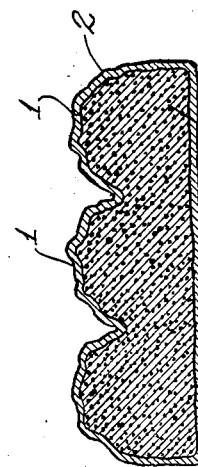
INVENTOR.
Leslie Belcher
BY Dyer & Taylor
ATTORNEYS.

Patented Jan. 11, 1927.

1,614,057

UNITED STATES PATENT OFFICE.

LESLIE BELCHER, OF PARK RIDGE, NEW JERSEY, ASSIGNOR TO MASON, AU & MAGENHEIMER CONFECTIONERY MANUFACTURING COMPANY, OF BROOKLYN, NEW YORK, A CORPORATION OF WEST VIRGINIA.

PROCESS FOR MAKING CONFECTIONS.

Application filed May 10, 1923. Serial No. 637,940.

This invention relates to confections in general, and particularly to confections having ingredients rich in food and medicinal properties as their main components, and to the process for making the same.

The medicinal qualities of the various kinds of bran, either of wheat, rye or the several other farinaceous grains, have been well and long recognized. The food values of bran have likewise been well and long recognized.

Extensive publicity has been given to the characteristics aforesaid of bran and the like, but this, notwithstanding, bran has not been favorably received by the public. Here and there in health institutions and the like and when prescribed as a diet, it is true, bran has been used. However, and probably on account of the medicinal character in which it has been cloaked, it still remains to become a popular food.

The present invention has, as one object, to incorporate bran in a form, to wit: a candy confection, which would help and possibly entirely break down the present opposition to bran, by the public in general.

The medicinal and food properties of raisins are well recognized.

The present invention has, as a further aim, to take advantage of the medicinal and food properties of raisins and to incorporate raisins in a form which is acceptable and popular with the public in general, to wit: in the form of a confection.

The invention has, as a still further object, to produce a confection in which raisins and bran are combined in a form that will be acceptable and popular with the public in general and in which, at the same time, they are so proportioned and so associated that the confection will be pleasing to the taste.

Another object of the invention is to produce a confection mainly composed of raisins and bran combined with flavoring ingredients, such for instance, as sugar, corn syrup, honey, and a fondant, whereby the peculiar raisin and bran qualities and flavors may be commingled so as to lose their pungent characteristics without losing any of their medicinal and food values.

To facilitate an understanding of the invention, one of the confections forming a part of the present subject matter is illustrated in the accompanying drawings in which Figure 1 illustrates the same in elevation, and Fig. 2 in longitudinal cross-section, while Fig. 3 is a diagrammatic view depicting apparatus in outline used for carrying out part of the process, and Fig. 4 is an elevation of a die plate used in said apparatus.

The confection forming the subject matter of part of the present invention is formed into a plurality of protrusions 1, having an irregular contour 2, and an inner body portion 3 which is somewhat puffed out to form a fluffy texture.

This confection is composed essentially of bran and raisins, properly cooked and mixed. As a binding and body forming element, it has been found that corn syrup serves admirably. In order to modify the peculiar acrid flavor of the bran and the raisins, suitable flavoring and sweetening ingredients may be added such as sugar, honey, and a fondant preferably made from sugar and corn syrup.

The raisins may be omitted when a cheaper product is desired and the medicinal and food values thereof are not required. In such cases, the relative proportions of the flavoring and body forming ingredients, preferably, would also be changed or modified.

In the manufacture of this confection, it has been found that excellent results are obtained when the following procedure, the process which constitutes an important part of the present invention, is employed.

The raisins are steamed in an ordinary steam container for a period of about ten (10) minutes, then removed and chopped into small particles as possible averaging about one sixteenth ($\frac{1}{16}$) of an inch in diameter, preferably in a standard chopping machine. Of course, the aforesaid step, when raisins are dispensed with, may either be omitted or another step substituted when another ingredient is used. The mass is then poured into a standard confection cooking kettle and there mixed with the required flavoring ingredients. In the present instance, the flavoring ingredients then added are sugar, corn syrup, and honey. The resulting mass is then cooked at a temperature of about twohundred and twenty five (225°) degrees Fahrenheit for a period of not less than twenty five (25) minutes, until the mass forms a soft dough-like ball.

Thereupon, the bran is gradually added and cooked into the mass, the relative proportions being ten (10) pounds of bran to one hundred and forty (140) pounds of the aforesaid doughy mass, the mixing of the same, preferably, taking place, so that one pound of bran will be added every minute, for ten (10) minutes until the required ten (10) pounds of bran are mixed into the mass. Thereupon the resulting mixture is preferably allowed to cook for a further period of fifteen (15) minutes and a further flavoring ingredient added. In the present instance, a fondant, preferably composed of sugar and corn syrup is then added while the mixture is cooking and the batter stirred for a period of about ten (10) minutes. The resulting mixture is then allowed to cool to ninety five degrees (95°) Fahrenheit, and placed in a bar-forming machine, such as the bar-forming machine 4, illustrated in Fig. 3, whereby the mixture will be fed out through the serrated openings 5 of the die plate 6 shown in Fig. 4, the clawing fingers 7 of which will engage into the extruding dough-like streams to puff out the same and thereby cause the streams to receive a somewhat fluffy inner texture, while the knives 8 will intermittently descend, serving in part to nick the stream and form successive protrusions, and also in part to sever the stream into successive units having a plurality of protrusions. After leaving the knives 8, the units will be deposited on the apron 9 to be conveyed to the discharging end 10 of the machine. The units are then preferably coated with chocolate. In the present instance, these units are coated with milk chocolate by dipping the same, as is customary, in the desired chocolate syrup with a standard chocolate dipping machine.

It is obvious that some of the ingredients above described may be omitted and others added, the various relations and proportions thereof changed and modified, and the steps of the process for making the confection changed and modified, without departing from the general spirit of the invention as set forth in the appended claims.

I claim:

1. The process of forming a confection of the class described consisting in forming a mixture of flavoring ingredients, cooking said mixture, adding bran, cooking the resulting mixture, adding a fondant, stirring the resulting mixture, allowing the mixture to cool and forming the confection units from said mixture.

2. The process of forming a confection of the class described consisting in forming a mixture of flavoring ingredients, cooking said mixture, adding bran, cooking the resulting mixture, adding a fondant, stirring the resulting mixture, allowing the mixture to cool, forming confection units from said mixture, and coating said units with chocolate.

This specification signed and witnessed this fifth day of May, 1923.

LESLIE BELCHER.